April 30, 1940. W. L. KELLER 2,199,136
VEHICLE SIGNAL DEVICE
Filed June 27, 1939 2 Sheets-Sheet 1
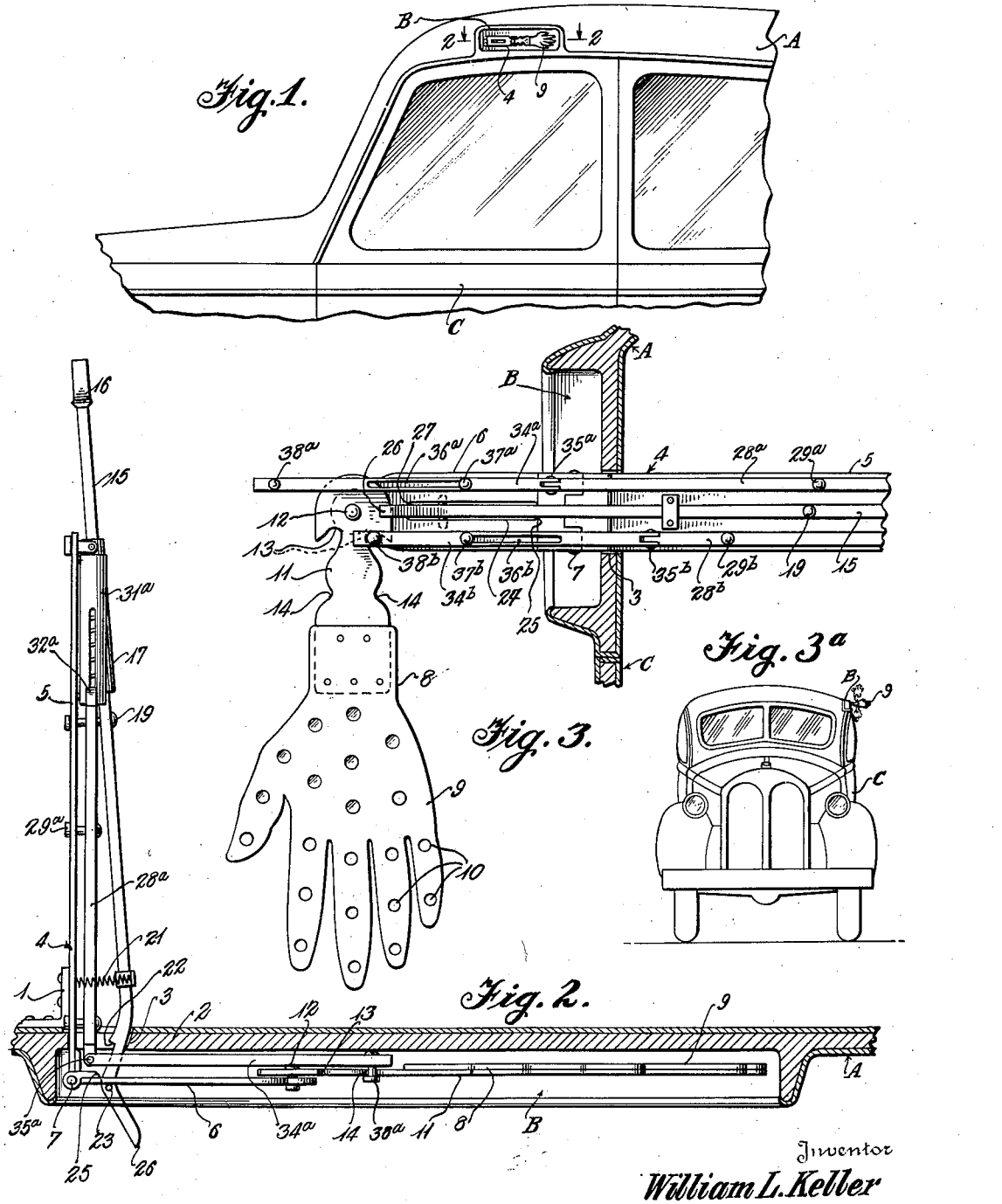
Inventor
William L. Keller
By James P. Burns
Attorney April 30, 1940.  W. L. KELLER  2,199,136
VEHICLE SIGNAL DEVICE
Filed June 27, 1939  2 Sheets-Sheet 2
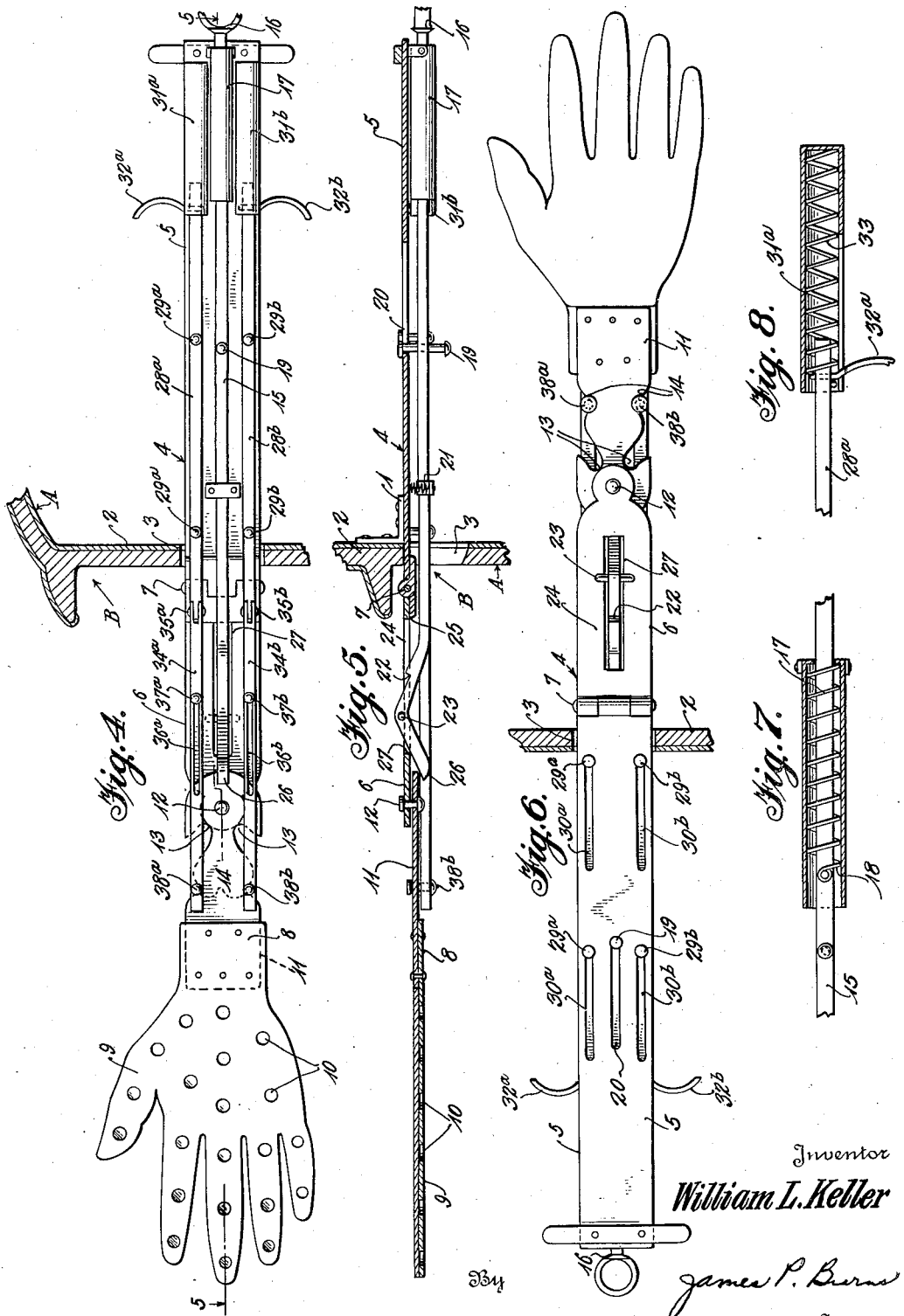
Inventor
William L. Keller
By James P. Burns
Attorney Patented Apr. 30, 1940

2,199,136

UNITED STATES PATENT OFFICE 2,199,136

VEHICLE SIGNAL DEVICE

William L. Keller, Washington, D. C.

Application June 27, 1939, Serial No. 281,491

3 Claims. (Cl. 116—52)

This invention relates to a vehicle signalling device of the character especially adapted for use in association with closed automobile bodies, truck cabs and the like.

It is the purpose of the invention to provide an effective and dependable signal device which may be conveniently operated by the driver of the vehicle from within the vehicle body.

Many accidents occur due to the failure of the driver of a closed vehicle to give the appropriate signal. In inclement and cold weather, drivers of closed vehicles notoriously fail to give any signal of contemplated movement of the car. Furthermore, delays incident to opening and closing windows for the purpose of giving signals interfere with the expeditious movement of traffic.

Accordingly, it is the purpose and object of the present invention to provide a signalling device which may be easily installed in an automobile body preferable above the door adjacent the driver's seat, and which can be conveniently and readily actuated by the driver. Further and more specifically, the invention contemplates a signalling device through the medium of which the driver may give signals effectively simulating the usual hand signals ordinarily given for right or left turns and for stopping. These signals are given from a position rendering them visible by both following and oncoming traffic.

Further and more detailed objects and advantages of the invention will be made apparent as the description proceeds, which will be developed in relation to the accompanying drawings wherein:

Figure 1 is a fragmentary side elevational view of a closed vehicle body showing the invention applied thereto.

Figure 2 is a view looking on the sectional line 2—2 of Fig. 1, showing the signal in retracted position.

Figure 3 is a fragmentery rear elevational view of the signal device showing its general relationship to the vehicle body wall and indicating the signal hand in a downwardly extending position.

Figure 3a is a fragmentary view in front elevation showing the location and appearance of the signal as viewed from an approaching vehicle.

Figure 4 is a view similar to Fig. 3 showing the signal hand in horizontally extending position.

Figure 5 is a sectional view along the line 5—5 of Fig. 4.

Figure 6 is a front elevational view of the complete signal device in the position shown in Fig. 4.

Figures 7 and 8 are detail views illustrating the spring plunger mechanisms associated with the signal actuating members.

Coming now to a description of the invention, it will be understood that like reference characters refer to like parts. In Figure 1, I have disclosed at A, an exemplary form of closed vehicle body provided with a signal receiving recess B positioned above the left-hand door C. This position for the signalling device has been selected because it is well above any of the tire carriers, lamps and other auxiliary equipment which might otherwise obstruct a clear view of the signal.

Referring to Fig. 2, it will be noted that a bracket 1 is secured to the inside of the wall 2 of the vehicle body. The wall 2 is provided with an opening 3 through which the signal device extends.

The signalling device embraces a primary support 4 rigidly secured to the bracket 1. The primary support is provided with the inwardly projecting stationary portion 5 and with the outwardly extending portion 6 hingedly connected together by the vertical pivot member 7. The signal member and all of the actuating parts, therefore, are thus carried by the primary support 4 and adapted to be attached to the vehicle as a unit through the medium of the bracket 1.

The signal device is indicated generally by the reference character 8. I have preferably adopted a signal member in the form of a hand simulating device whereby to give a more realistic effect to the signal. The signal member may take the form of a metal covered surface possessing high light reflecting properties. In order to more effectively create a signalling effect, I have found it advantageous to provide the signal member with a covering plate 9 having suitable perforations 10 at selected points throughout its area. Obviously, both the front and rear surfaces of the signalling member may be provided with the high light reflecting surfaces and also with cover members such as that indicated at 9 to concentrate the zones on the respective faces of the signalling members from which the light of outer and oncoming or following vehicles may be reflected.

The signal hand 9 is supported on a wrist-like member 11 mounted about a horizontal axis on the pivot pin 12 carried by the portion 6 of the primary support 4. The wrist-like member 11 is provided on its opposite edges with complementary recesses 13 and notches 14, the purpose of which will be presently described.

Next coming to a description of the mechanism for actuating the signal, I shall first describe the means for pivoting the second portion 6 of the primary support 4 about the vertical axis 7 whereby the signal member 8 is brought into a horizontally extending position for signalling purposes and also into a position in parallelism with the vehicle body whereby the signal may be retracted into the recess B. By reference to Fig. 4, it will be noted that there is mounted on the stationary inwardly extending portion 5 of the primary support 4, a central longitudinally movable plunger 15 provided at its free end 16 with a thumb press button or ring. The plunger rod 15 extends through the cylinder 17 (shown in detail in Fig. 7) and is surrounded by the spring 18. Normally the spring 18 acts to hold the plunger 15 in the retracted position shown more particularly in Fig. 2. It will be understood that the cylinder 17 is carried by the stationary portion 5 of the primary support 4 in such manner as to permit the slight relative lateral movement of the plunger 15 with respect to the support 5 required to enable the plunger 15 to move from the position shown in Fig. 5 to the position shown in Fig. 2, and vice versa. A suitable guide pin 19 extends through the plunger 15 and is guided in the slot 20 in the member 5. A spring 21 interconnects the plunger rod 15 and the support 4 and functions to draw the plunger rod 15 toward the support 4. The end of the plunger 15 beyond the spring connection 21 is of a special configuration and is provided with a notch 22 and a pin 23. The portion of the plunger rod 15 intermediate the notch 22 and the pin 23 (in the relation of the part shown in Fig. 2) extends through the elongated slot 24 in the pivoted extension 6 of the primary support 4.

In the position of the parts shown in Fig. 2, the plunger rod 15 has its end 16 projected inwardly under the influence of the spring 17. The pin 23 at the opposite end of the plunger rod 15 is thus drawn against the outer or forward face of the pivoted portion 6 of the support 4 and pulls the same into retracted position in parallelism with the vehicle body wall.

When it is desired to swing the portion 6 about the pivot 7 to project the signal member 8 into a horizontal position, it is only necessary for the vehicle driver to place his thumb against the end 16 of the plunger rod 15 and press the same outwardly against the pressure of the spring 17. This action brings the notch 22 into abutting contact with the shoulder 25 on the member 6. Further pressure swings the member 6 into projected position as shown in Fig. 5. As the notch 22 leaves the shoulder 25, the curved end 26 of the plunger rod 15 passes through the slot 24 in the member 6 and acts against the end 27 of the slot 24 to cam the member 6 into a true horizontal position (see Fig. 5).

From the foregoing description, it will be apparent that with the parts of the signal device in the position shown in Fig. 2, the operator can, by merely exerting pressure on the end 16 of the plunger rod 15, swing the signal device into the position shown in Fig. 4. This is accomplished due to the unique co-action of the notch 22, shoulder 25, cam end 26, and outer end 27 of the slot 24. Upon the release of pressure on the end 16 of the plunger rod 15, that rod is again returned to the position shown in Fig. 2 under the influence of the spring 17 and due to the pin 23 acting against the outer or forward surface of the member 6, the latter is also swung into retracted position, carrying with it the signal member 8.

The mechanism thus far described is therefore adequate to permit the driver of the vehicle to give an emergency signal indicative of making a stop. Should the operator desire to give a further indication of the contemplated movement of the vehicle, such as a right turn or a left turn, this may be accomplished through the medium of the mechanism now to be described.

By reference to Fig. 4, it will be observed that the support 5 carries two additional plunger rods designated 28a and 28b. These plunger rods are in substantial duplication. The plunger rod 28a is employed to effect an upward swinging of the signal member 8 about the pivot point 12, while the plunger rod 28b is employed to effect a downward swinging movement of the signal member 8 about the pivot 12.

The plunger rods 28a and 28b are respectively provided with guide pins 29a and 29b projecting through slots 30a and 30b in the stationary supporting member 5.

The plunger rods 28a and 28b are adapted to be projected into the position shown in Figs. 4, 5 and 6 by springs disposed in the cylinders 31a and 31b, respectively, against which plunger rods 28a and 28b are adapted to be drawn by a finger of the operator through the medium of the actuating members 32a and 32b. This mechanism is shown in detail in Fig. 8, wherein the spring is designated 33.

The plunger rods 28a and 28b are thus mounted on stationary portion 5 of the primary support 4 and are adapted to partake of longitudinal reciprocatory motion along this support. They likewise extend through the opening 3 in the vehicle wall 2. Each of the plungers 28a and 28b is provided outside of the vehicle wall with a pivoted section respectively designated 34a and 34b. Section 34a and 34b are pivoted to sections 28a and 28b at 35a and 35b, respectively, and are respectively provided with slots 36a and 36b through which pins 37a and 37b carried by the pivoted portion 6 of the primary support 4 extend.

Adjacent their free ends, the sections 34a and 34b of the plunger rods 28a and 28b carry the laterally projecting studs 38a and 38b which cooperate with the recesses 13 and the notches 14 in the member 11 of the signal device.

For example, when the driver desires to indicate a right-hand turn, and assuming the parts of the device to be in the position shown in Fig. 2, he first exerts pressure on the end 16 of the plunger 15 to swing the pivoted portion 6 of the support and the signal member 8 into horizontally projecting position. He next exerts a pull on the actuating member 32a to retract the plunger rod 28a against its associated spring 33. This causes the stud 38a to move into the recess 13 above the pivot 12 and further pull swings the signal member about the said pivot 12 until it extends vertically above the said pivot. Upon release by the operator of the actuating member 32a, the associated spring 33 again forces the plunger rod 28a and the pivoted section 34a outwardly causing the stud 38a to move over the cam surface intermediate the notch 14 and recess 13 to thereby again swing the signal member 8 into a truly horizontal position where it is held because the studs 38a and 38b are spring pressed into the notches 14.

Assuming now that the operator is desirous of indicating a left-hand turn, he carries out the same operation as that described in the preceding paragraph except that he actuates the plunger rod 28b through the member 32b against the associated spring 33. In this case, the stud 36b is brought to bear against the recess 13 below the pivot 12 and therefore causes the signal member 8 to be swung downwardly about this pivot into the position shown in Fig. 3. When the operator desires the parts to be returned into retracted position as shown in Fig. 2, he merely first releases either the actuating member 32a or 32b depending upon whether he has signalled for a right-hand or a left-hand turn and thereafter releases pressure which he has been exerting on the end 16 of the plunger rod 15, whereupon the spring 18 returns the plunger rod 15 to the position shown in Fig. 2, and along with it returns the signal member 8 into a position in parallelism with the wall of the vehicle body.

It is understood that the foregoing description has been given in clarification and explanation of the invention and not in limitation thereof, the scope of the invention being defined by the subjoined claims.

Having thus described my invention, I claim:

1. A vehicle signal of the character adapted for use on closed automobiles, truck cabs and the like comprising a primary support having one portion extending interiorly of the vehicle body and a second portion hingedly carried by said first portion exteriorly of the vehicle body and adapted to swing about a vertical axis, a signal member carried by said second portion adapted to partake of the movements thereof, said signal member being additionally mounted for movement about a horizontal axis whereby the same may be brought into at least three signalling positions, an actuating member reciprocably mounted on said primary support for swinging said second portion about its vertical axis, a pair of bars slidably mounted on said support one of said bars adapted to swing said signal member to a position vertically above its horizontal axis and the other of said bars being adapted to swing the signal member to a position vertically below said horizontal axis.

2. A vehicle signal of the character adapted for use on closed automobiles, truck cabs and the like comprising a primary support having one portion extending interiorly of the vehicle body and a second portion hingedly carried by said first portion exteriorly of the vehicle body and adapted to swing about a vertical axis, a signal member carried by said second portion adapted to partake of the movements thereof, said signal member being additionally mounted for movement about a horizontal axis whereby the same may be brought into at least three signalling positions, and actuating members mounted for longitudinal reciprocation on said primary support one of said members being operable for swinging said second portion about its vertical axis, a second of said members adapted to swing said signal member to a position vertically above its horizontal axis and another of said members being adapted to swing the signal member to a position vertically below said horizontal axis, said actuating members additionally cooperating with said primary support to sustain said signal member in a horizontally extending position.

3. A vehicle signal of the character adapted for use on closed automobiles, truck cabs and the like comprising a primary support having one stationary portion extending interiorly of the vehicle body and a second portion hingedly carried on a vertical axis by said first portion exteriorly of the vehicle body means to swing said second portion about said vertical axis, a signal member carried by said second portion adapted to partake of the movements thereof, said signal member being additionally mounted for movement about a horizontal axis whereby the same may be brought into at least three signalling positions and actuating bars slidably carried by said primary support, said actuating bars each embracing two sections hingedly connected together by a vertical pivot, said pivot adapted to be brought into alignment with the vertical axis about which the second portion of said primary support swings to permit retracting of said signal member into a position in parallelism with the vehicle body wall.

WILLIAM L. KELLER.